(12) United States Patent
Sengodan et al.

(10) Patent No.: US 12,334,839 B2
(45) Date of Patent: Jun. 17, 2025

(54) POWER CONVERTER HAVING DIODE BRIDGES IN PARALLEL WITH INTERCONNECT SWITCHING MODULE

(71) Applicant: Hamilton Sundstrand Corporation, Charlotte, NC (US)

(72) Inventors: Rajkumar Sengodan, Bangalore (IN); Saravanan Munusamy, Chengalpattu (IN)

(73) Assignee: Hamilton Sundstrand Corporation, Charlotte, NC (US)

( * ) Notice: Subject to any disclaimer, the term of this patent is extended or adjusted under 35 U.S.C. 154(b) by 224 days.

(21) Appl. No.: 18/117,192

(22) Filed: Mar. 3, 2023

(65) Prior Publication Data
US 2023/0283201 A1 Sep. 7, 2023

(30) Foreign Application Priority Data
Mar. 5, 2022 (IN) .............................. 202241011985

(51) Int. Cl.
*H02M 7/5387* (2007.01)
*H02M 7/487* (2007.01)

(52) U.S. Cl.
CPC ......... *H02M 7/5387* (2013.01); *H02M 7/487* (2013.01)

(58) Field of Classification Search
CPC ............................ H02M 7/5387; H02M 7/487
See application file for complete search history.

(56) References Cited

U.S. PATENT DOCUMENTS

| | | | |
|---|---|---|---|
| 6,728,120 B1 | 4/2004 | Greif et al. | |
| 9,083,230 B2 | 7/2015 | Narimani et al. | |
| 9,413,268 B2* | 8/2016 | Fu | H02J 3/38 |
| 9,641,098 B2* | 5/2017 | Fu | H02M 7/4837 |
| 9,825,549 B2 | 11/2017 | Choi et al. | |
| 9,973,108 B2* | 5/2018 | Wang | H02M 1/08 |
| 9,979,318 B2 | 5/2018 | Kadam et al. | |
| 10,177,679 B2* | 1/2019 | Korhonen | H02M 7/487 |

(Continued)

FOREIGN PATENT DOCUMENTS

| | | | | |
|---|---|---|---|---|
| CN | 102769404 A | | 11/2012 | |
| CN | 104038090 B | * | 1/2017 | ............ H02M 7/487 |

(Continued)

OTHER PUBLICATIONS

Extended European Search Report issued by Steven Lochhead, of the European Patent Office, dated Jul. 6, 2023, in corresponding European Patent Application No. 23160214.5.

*Primary Examiner* — Sisay G Tiku (57) ABSTRACT

In accordance with at least on aspect of this disclosure, a system, includes, a DC voltage input configured to provide AC voltage to a load, and a converter operatively connected between the voltage input and the load, configured to convert a DC voltage from the DC voltage input to the AC voltage. In embodiments, the converter can include a first inverter stage operatively connected between the voltage input and a diode bridge, for example, configured to connect one or more intermediate voltage levels to the load. The converter can include a second inverter stage operatively connected between the diode bridge and the load, and an interconnect switching module disposed at the second inverter stage operatively connected to control an output level of the converter at the load.

20 Claims, 10 Drawing Sheets

(56) References Cited

U.S. PATENT DOCUMENTS

| | | |
|---|---|---|
| 10,277,144 B2 | 4/2019 | Soeiro et al. |
| 10,581,313 B2 * | 3/2020 | McBryde .............. H02M 7/487 |
| 2013/0301314 A1 * | 11/2013 | Fu ......................... H02M 7/487 |
| | | 363/37 |
| 2016/0268924 A1 * | 9/2016 | Fu ......................... H02M 7/483 |
| 2017/0302195 A1 | 10/2017 | Ye et al. |
| 2018/0115243 A1 * | 4/2018 | Fu ......................... H02M 7/487 |
| 2019/0267889 A1 * | 8/2019 | McBryde .............. H02M 7/537 |
| 2020/0007050 A1 * | 1/2020 | Fu ......................... H02M 7/4837 |
| 2020/0021203 A1 | 1/2020 | Xie et al. |
| 2020/0052596 A1 * | 2/2020 | Xie ....................... H02M 7/483 |

FOREIGN PATENT DOCUMENTS

| | | | | |
|---|---|---|---|---|
| CN | 107517019 A | * | 12/2017 | .............. H02J 3/383 |
| DE | 102014005124 A1 | | 10/2015 | |
| EP | 2306629 B1 | * | 7/2014 | ............ H02M 7/483 |
| EP | 2594007 B1 | * | 11/2014 | ................ H02J 7/00 |
| WO | WO-2012007700 A2 | * | 1/2012 | ................ H02J 7/00 |
| WO | WO-2017028776 A1 | * | 2/2017 | ............ H02M 7/483 |
| WO | WO-2019060401 A1 | * | 3/2019 | ............ H02M 7/483 |

\* cited by examiner

POWER CONVERTER HAVING DIODE BRIDGES IN PARALLEL WITH INTERCONNECT SWITCHING MODULE

CROSS-REFERENCE TO RELATED APPLICATIONS

This application claims priority to and the benefit of Indian Provisional Patent Application No. IN202241011985, filed Mar. 5, 2022, the entire content of which is incorporated herein by reference.

TECHNICAL FIELD

The present disclosure relates to power converters, and more particularly to multilevel power converters.

BACKGROUND

Multilevel converters have become popular due to the demands of high power and high voltage applications such as high voltage direct current (HVDC), static VAR compensators (SVC) and AC drives. In typical multi-level converters, the number of switches connected in series increases with the number of converter levels. Accordingly, the total converter cost increases as well as semiconductor conduction losses.

Therefore, there remains a need in the art for improved multilevel converter topologies, for example having fewer switches. This disclosure provides a solution for this need.

SUMMARY

In accordance with at least on aspect of this disclosure, a system, includes, a DC voltage input configured to provide AC voltage to a load, and a converter operatively connected between the voltage input and the load, configured to convert a DC voltage from the DC voltage input to the AC voltage. In embodiments, the converter can include a first inverter stage operatively connected between the voltage input and a diode bridge, for example, configured to connect one or more intermediate voltage levels to the load. The converter can include a second inverter stage operatively connected between the diode bridge and the load, and an interconnect switching module disposed at the second inverter stage operatively connected to control an output level of the converter at the load. In certain embodiments, the converter can include a multilevel converter, such as a four-level voltage source converter.

In embodiments, the diode bridge can be a first diode bridge, and the second inverter stage can include a second diode bridge. In certain such embodiments, the interconnect switching module can thus be operatively connected between the first diode bridge and the second diode bridge. In embodiments, the interconnect switching module can include a plurality of transistors driven by a control module. In certain embodiments, the plurality of transistors can be or include one or more of an IGBT, and/or MOSFETs. In embodiments, the first inverter stage includes one or more switches (e.g., transistors) operatively connected to control a voltage of the voltage input In certain such embodiments, the one or more switches of the first inverter stage can be or include one or more of an IGBT, and/or MOSFETs.

In certain embodiments, one or more of the transistors can have a characteristic breakdown voltage, wherein voltage applied to the transistors within the breakdown voltage is blocked from passing through the transistor. In embodiments, one or more of the transistors can include one or more active switches, operatively connected to allow for bidirectional implementation.

In embodiments, the voltage input can be or include a DC link operatively connected at an input of the first inverter stage, configured to supply voltage from a voltage source to the load. In certain embodiments, the DC link can include two or more capacitors operatively connected in series between a positive line of the voltage input and a negative line of the voltage input. In certain embodiments, the DC link can be configured to receive DC voltage from a rectifier, where the voltage source includes the rectifier. In certain embodiments, the voltage source could be or includes one or batteries.

In certain embodiments, the two or more capacitors can be or include voltage-dividing capacitors. In certain embodiments, the two or more capacitors can include four capacitors and the diode bridge can be a full bridge including four rectifier diodes. In certain embodiments, the two or more capacitors can include four capacitors, and the diode bridge can be a half bridge including two rectifier diodes.

In embodiments, the system can include the control module, wherein the controller can include computer readable instructions, configured to cause the control module to operate the interconnect switching module to control the output level of the converter at the load to convert the DC voltage to the AC voltage.

In in a first state, the computer readable instructions can be configured to cause the control module to activate a first switch (Q3) such that a first capacitor (C1) provides a positive voltage to the load and a first rectifier diode D1 enters a reverse bias state to stop conducting voltage. In the first state, the computer readable instructions can be further configured to cause the control module to activate a second switch at the second inverter stage such that the positive voltage from the first capacitor is provided to the load via the second switch.

In a second state, the computer readable instructions can be configured to cause the control module to deactivate the first switch, such that a second capacitor (C2) provides the positive voltage to the load, through the first rectifier diode and the second switch.

In a third state, the computer readable instructions can be configured to cause the control module deactivate the second switch and activate a third switch 'Q2' at the second inverter stage such that a third capacitor 'C3' provides a negative voltage to the load via a second diode D4. In a fourth state, the computer readable instructions can be further configured to cause the control module to activate a fourth switch (q4) at the first inverter stage, such that the negative voltage from the third capacitor is provided to the load via the fourth switch and the second rectifier diode enters a reverse bias state to stop conducting voltage.

In embodiments, the computer readable instructions can be configured to cause the control module operate the switching module to produce multiple output voltage levels. In certain embodiments, one or more switches operatively connected directly between the voltage input and the load, configured to provide a neutral point clamp for bi-directional switching of the load.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
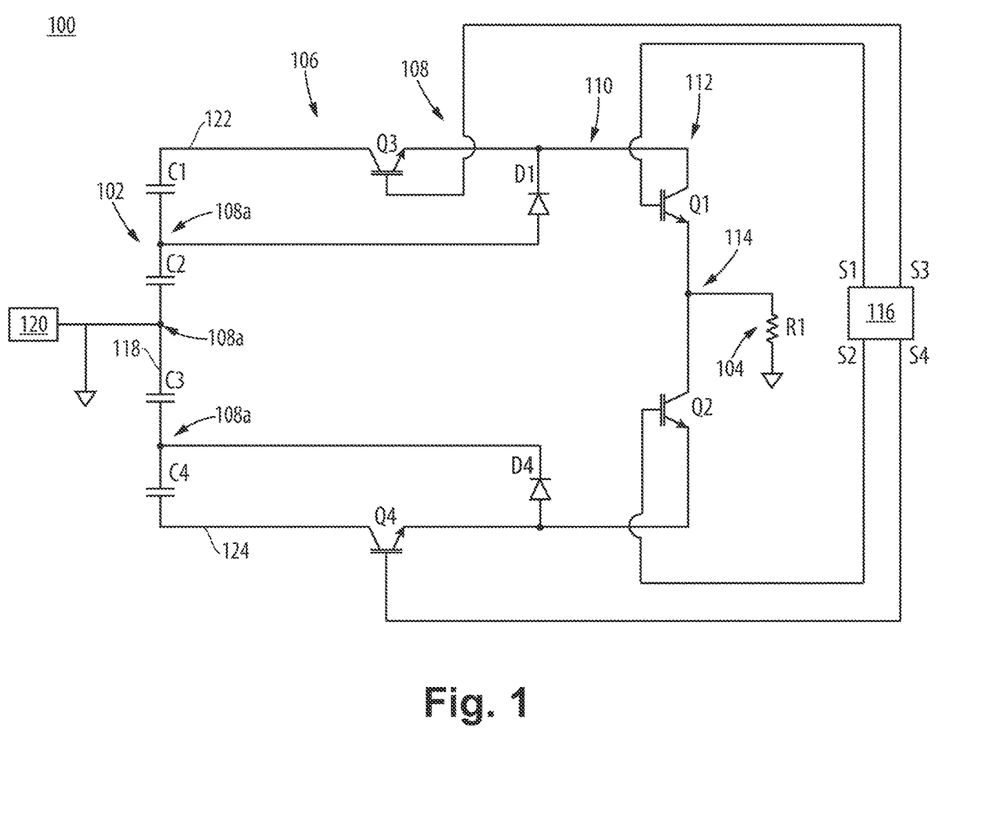
FIG. 1 is a schematic diagram of a system in accordance with this disclosure, showing an embodiment of a power converter having an interconnect switching module.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-10.

Figure 2:
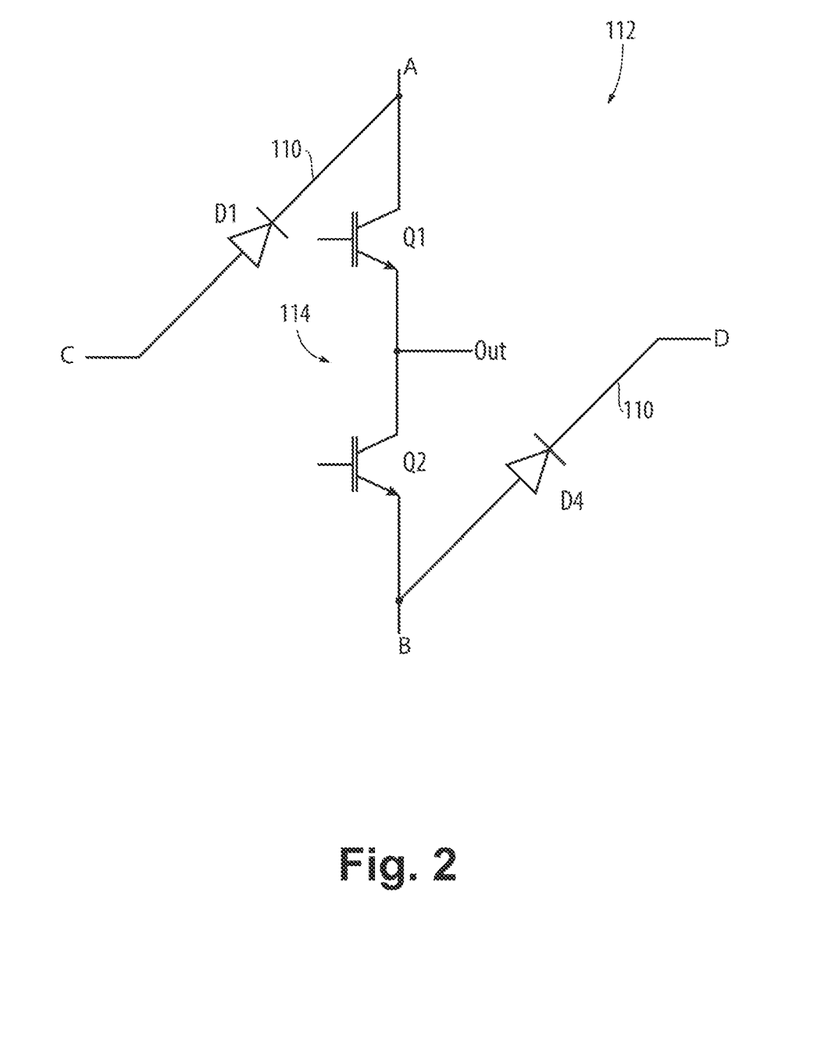
FIG. 2 is a partial schematic diagram of the system of FIG. 1, showing a configuration of the interconnect switching module.
Figure 3:
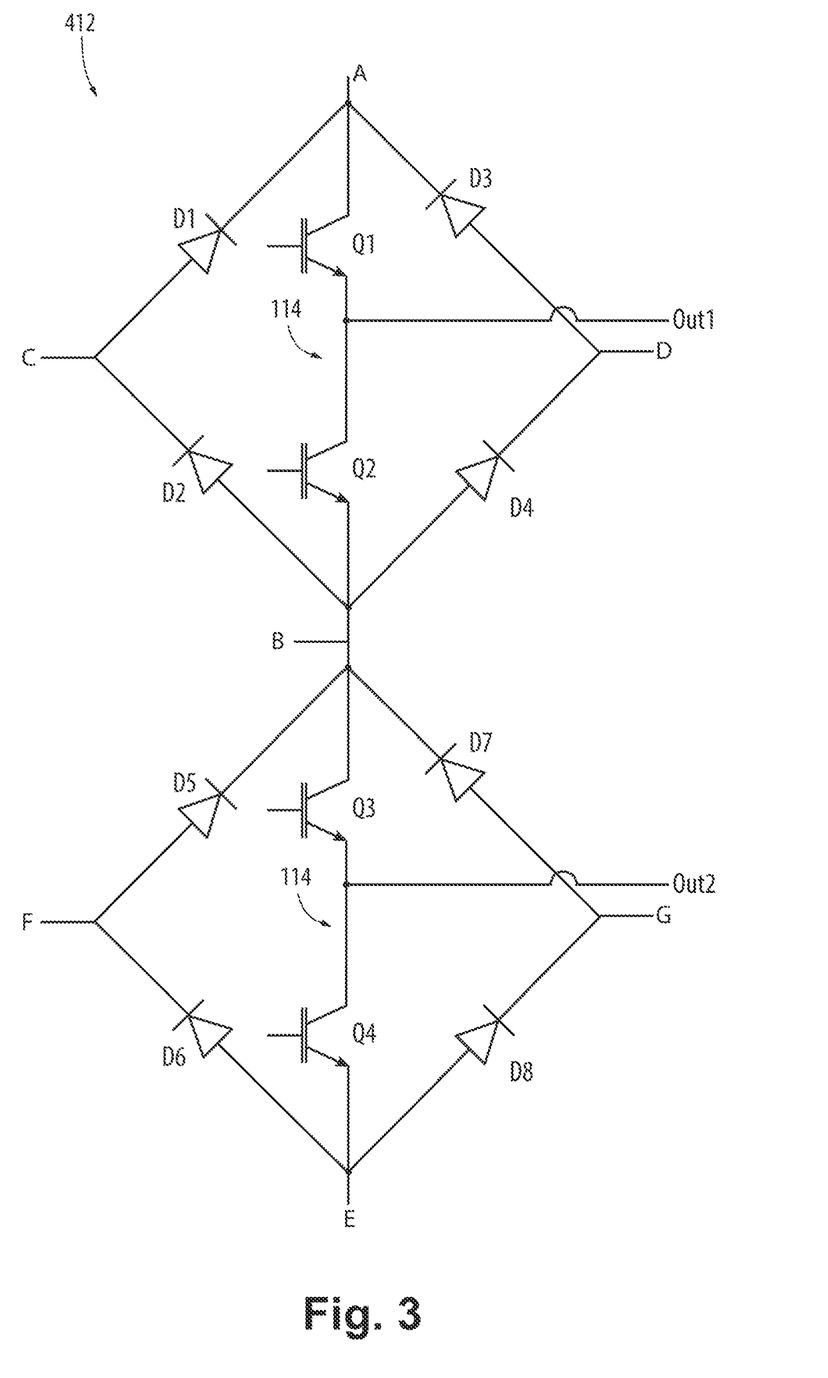
FIG. 3 is a partial schematic diagram of a system in accordance with this disclosure, showing a configuration of an interconnect switching module of another embodiment of a power converter.

As shown in FIGS. 1-2, in accordance with at least on aspect of this disclosure, a system 100, can include, a DC voltage input 102 configured to provide AC voltage to a load 104, and a converter 106 operatively connected between the voltage input 102 and the load 104, configured to convert a DC voltage from the DC voltage input to the AC voltage provided to the load. In embodiments, the converter 106 can include a first inverter stage 108 operatively connected between the voltage input 102 and a diode bridge 110. The converter 106 can include a second inverter stage 112 operatively connected between the diode bridge 110 and the load 104, and an interconnect switching module 114 disposed at the second inverter stage 112 operatively connected to control an output level of the converter 106 at the load 104. The second inverter stage 112 can be configured to connect one or more intermediate voltage levels to the load 104 (e.g., as shown in FIGS. 2-3). In certain embodiments, the converter 106 can include a multilevel converter, such as a two-level converter (e.g., as shown in FIG. 3, where a configuration of a two level full bridge interconnect switching module 114 is shown as the second inverter stage 412), or a four-level voltage source converter.

In embodiments, the interconnect switching module 114 can include a plurality of switches (e.g., transistors) Q1, Q2 driven by a control module 116. In certain embodiments, the plurality of switches Q1, Q2 can be or include transistors, such as one or more of an IGBT, and/or MOSFETs, for example. The configuration of the interconnect switching module 114 with respect to the diode bridge 110 is shown more clearly in FIG. 2. In embodiments, the first inverter stage 108 can also include one or more switches (e.g., transistors) Q3, Q4 operatively connected to control a voltage of the voltage input. In certain such embodiments, the one or more switches of the first inverter stage 108 can be or include one or more of an IGBT, and/or MOSFET, for example driven by the control module 116.

In certain embodiments, one or more of the transistors Q1, Q2, Q3, Q4 can have a characteristic breakdown voltage, wherein voltage applied to the transistors Q1, Q2, Q3, Q4 within the breakdown voltage is blocked from passing through the transistor Q1, Q2, Q3, Q4. In embodiments, one or more of the transistors Q1, Q2, Q3, Q4 can include one or more additional active switches (e.g., Q5, Q6 as shown and described with respect to FIG. 10), operatively connected to allow for bidirectional implementation.

In embodiments, the voltage input can be or include a DC link 118 operatively connected at an input 108a of the first inverter stage 108, configured to supply voltage from a voltage source 120 to the load. In certain embodiments, the DC link 118 can include two or more capacitors C1, C2, C3, and/or C4 operatively connected in series between a positive line 122 of the voltage input 102 and a negative line 124 of the voltage input 102. In certain embodiments, the DC link 118 can be configured to receive DC voltage from a rectifier (not shown), where the voltage source 120 includes the rectifier. In certain embodiments, the voltage source 120 could be or include one or more batteries, for example. Any other suitable DC voltage source is contemplated herein.

In certain embodiments, the two or more capacitors C1, C2, C3, and/or C4 can be or include voltage-dividing capacitors. In certain embodiments, the two or more capacitors can include four capacitors C1, C2, C3, C4, and the diode bridge 110 can be a half bridge including two rectifier diodes D1, D4. An output voltage level can be based on the assumption that the total voltage Vctotal across the DC-link 118 is equally shared between the intermediate terminals, such that Vc1=(Vc2+Vc3)=Vc4=Vctotal/3.

In embodiments, the control module 116 can include computer readable instructions, configured to cause the control module 116 to operate the interconnect switching module 114 to control the output level of the converter 106 at the load 104, to convert the DC voltage to the AC voltage. In embodiments, the computer readable instructions can be configured to cause the control module 116 operate the interconnect switching module 114 to produce multiple output voltage levels, for example for each state of the interconnect switching module 114, as described below, and/or to produce an output voltage level for each level of the converter if the converter 106 is a multi-level converter.

Figure 4:
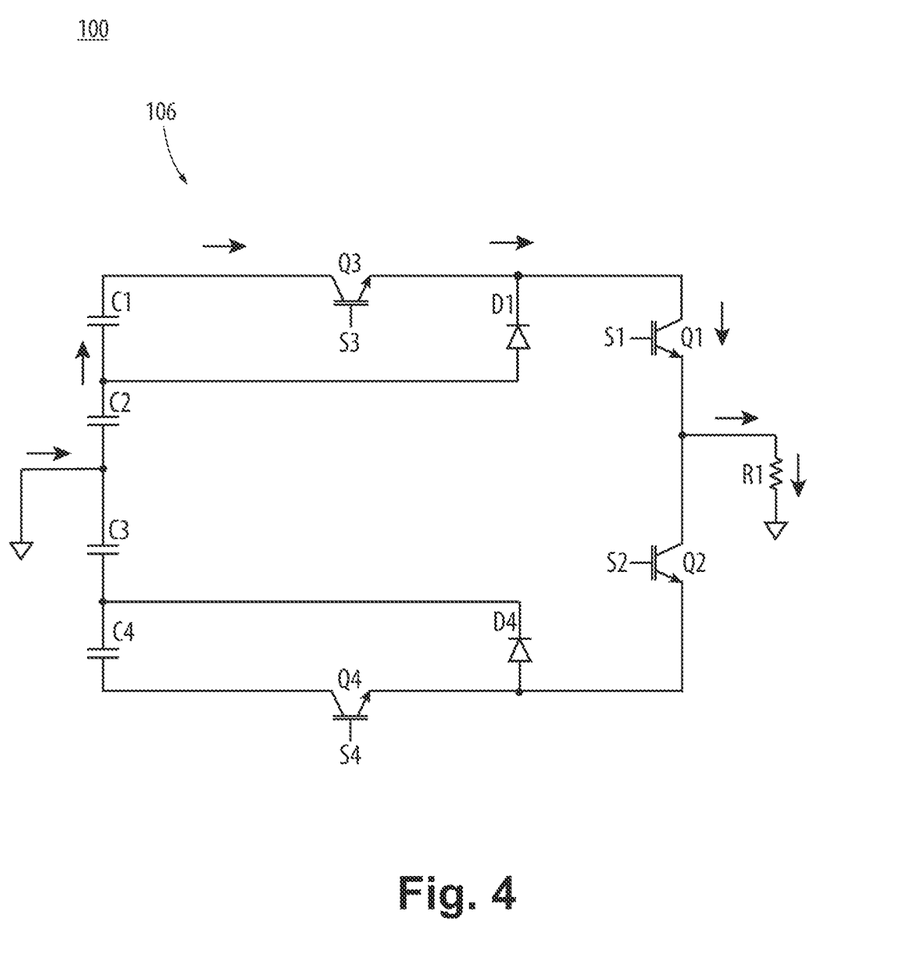
FIG. 4 is a schematic diagram of the system of FIG. 1, showing the power converter in a first state.

In in a first state, such as shown in FIG. 4, the computer readable instructions can be configured to cause the control module 116 to activate a first switch Q3 such that a first capacitor C1 provides a positive voltage to the load 104 and a first rectifier diode D1 enters a reverse bias state to stop conducting voltage. In the first state, the computer readable instructions can be further configured to cause the control module 116 to activate switch Q1 at the second inverter stage 112 such that the positive voltage from the first capacitor C1 is provided to the load 104 via the switches Q3 and Q1.

Figure 5:
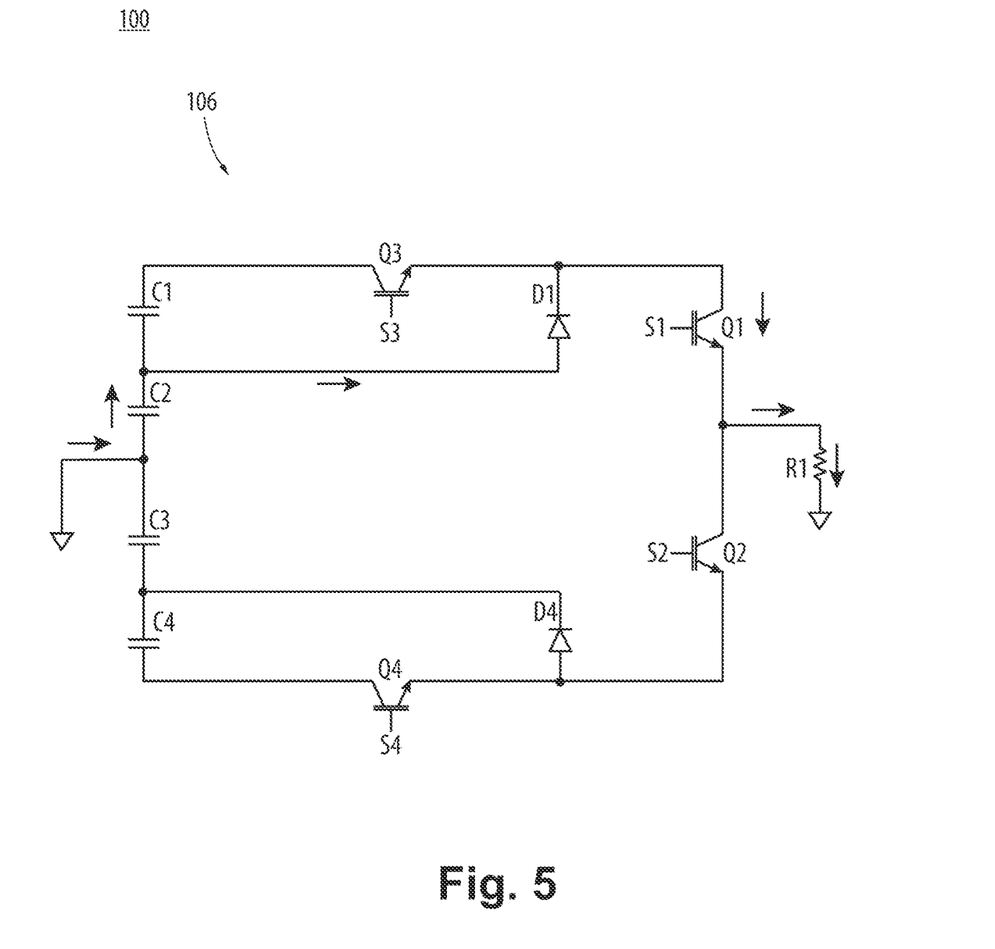
FIG. 5 is a schematic diagram of the system of FIG. 1, showing the power converter in a second state.

In a second state, such as shown in FIG. 5, the computer readable instructions can be configured to cause the control module 116 to deactivate the first switch Q3, such that a second capacitor C2 provides the positive voltage to the load 104, through the first rectifier diode D1 and the second switch Q1.

Figure 6:
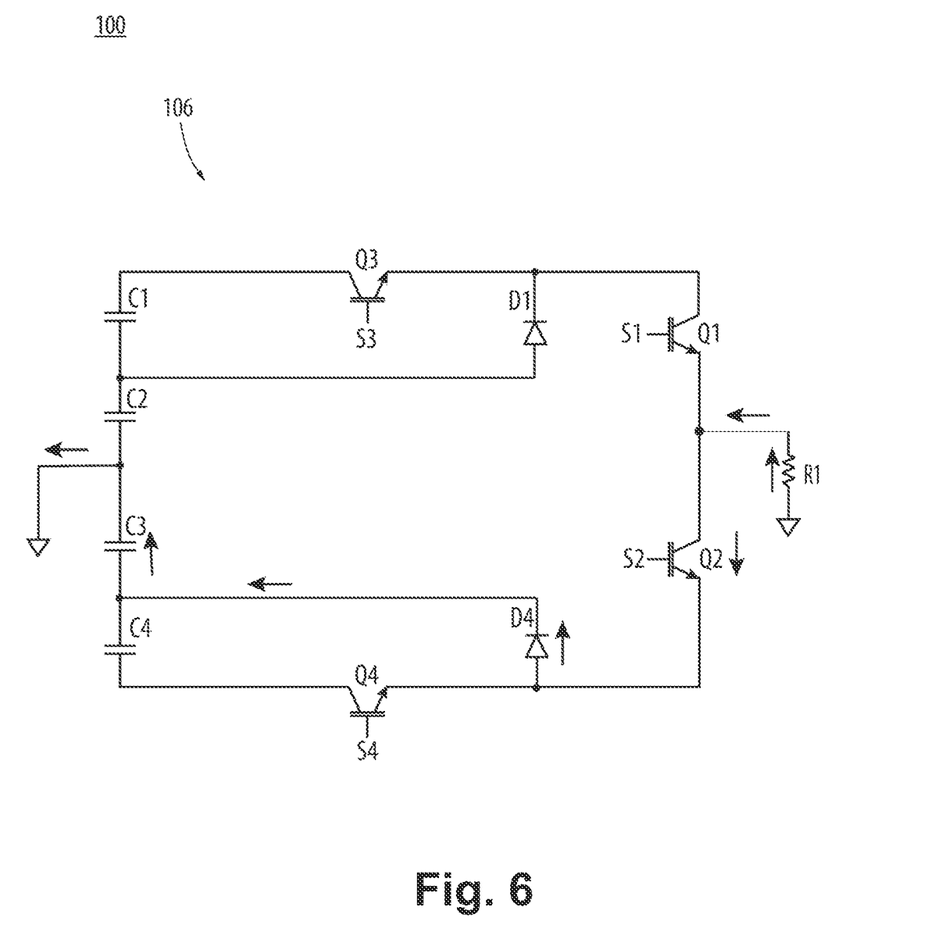
FIG. 6 is a schematic diagram of the system of FIG. 1, showing the power converter in a third state.

In a third state, such as shown in FIG. 6, the computer readable instructions can be configured to cause the control module 116 deactivate the second switch Q1 and activate a third switch Q2 at the second inverter stage 112 such that a third capacitor C3 provides a negative voltage to the load 104 via a second rectifier diode D4.

Figure 7:
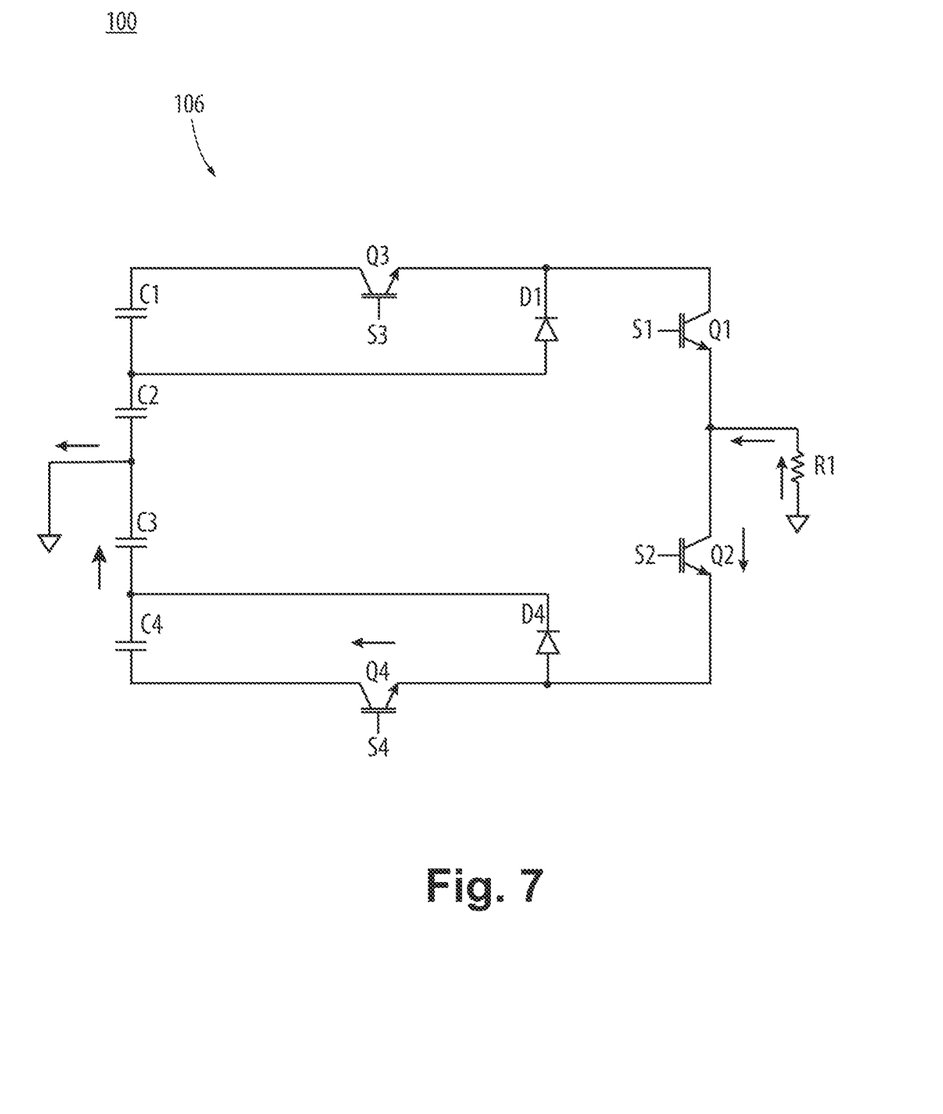
FIG. 7 is a schematic diagram of the system of FIG. 1, showing the power converter in a fourth state.

In a fourth state, such as shown in FIG. 7, the computer readable instructions can be further configured to cause the control module 116 to activate a fourth switch Q4 at the first inverter stage 108, such that the negative voltage from the third capacitor C3 is provided to the load 104 via the fourth switch Q4 and the second rectifier diode D4 enters a reverse bias state to stop conducting voltage.

In embodiments, the control module 116 and/or other components of system 100 can be or include both hard wired circuits that cause a logic (e.g. predictive) to be executed, and/or software-based components, for example, simple electric circuits employing analogue components, or the controller can include a CPU, a memory, machine readable instructions in the memory that when executed cause the CPU to perform a method or cause the control module 116 to perform a method, for example as described herein. In embodiments, the control module 116 can utilize any suitable algorithm to control the any of the switches in the first inverter stage 108, the interconnect switching module 114 and the drivers, and the like as provided herein. In embodiments, the algorithm could be constructed using the functionality as described above in addition to known general engineering principles as applied to the specific characteristics of each particular system to which the technology of the present disclosure is applied.

Figure 8:
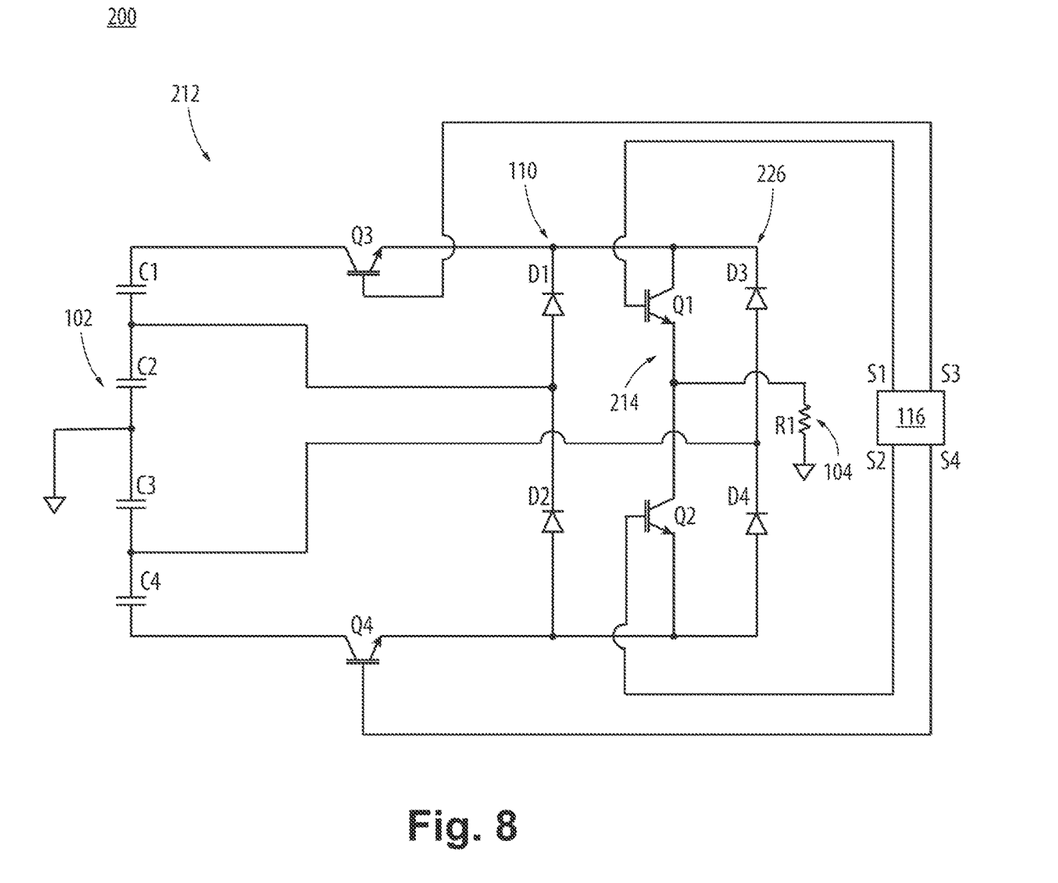
FIG. 8 is a schematic diagram of a system in accordance with this disclosure, showing another embodiment of a power converter having an interconnect switching module.
Figure 9:
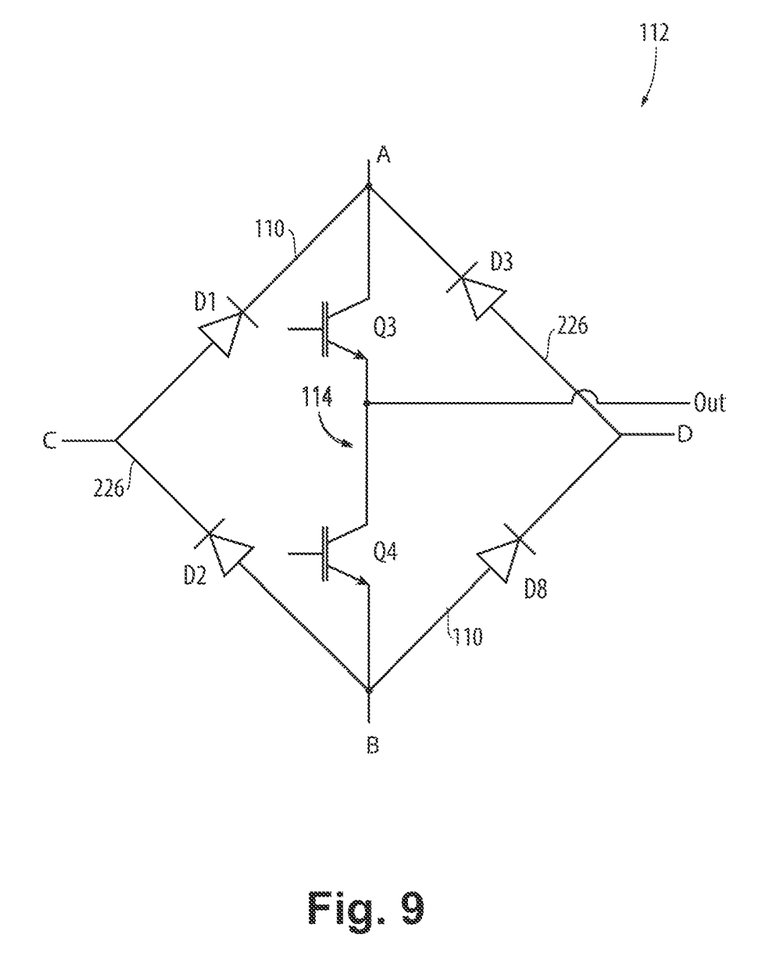
FIG. 9 is a partial schematic diagram of the system of FIG. 8, showing a configuration of the interconnect switching module.

Turning to FIGS. 8-9, in certain embodiments a system 200 can be similar to that of system 100, for example system 200 can have similar components and features with respect to system 100. For brevity, the description of common elements that have been described above for system 100 are not repeated with respect to system 200 as shown in FIGS. 8-9.

In the system 200, the diode bridge 110 can be a first diode bridge, and the second inverter stage 212 can include a second diode bridge 226. In certain such embodiments, the interconnect switching module 214 can thus be operatively connected between the first diode bridge 110 and the second diode bridge 226. A configuration of the interconnect switching module 214 and the first and second diode bridges 110, 226 can be seen in FIG. 9.

In system 200, the two or more capacitors can include four capacitors C1, C2, C3, C4 and the first and second diode bridges 110, 226 can form a full bridge including four rectifier diodes D1, D2, D3, D4. The operation of system 200 can be the same or similar as shown and described for system 100. For example the switching states for each of Q1, Q2, Q3, Q4 can be common to that of system 100 such that the control module 116 can be configured to operate the interconnect switching module 214 to produce multiple output voltage levels, for example for each state of the interconnect switching module 214.

Figure 10:
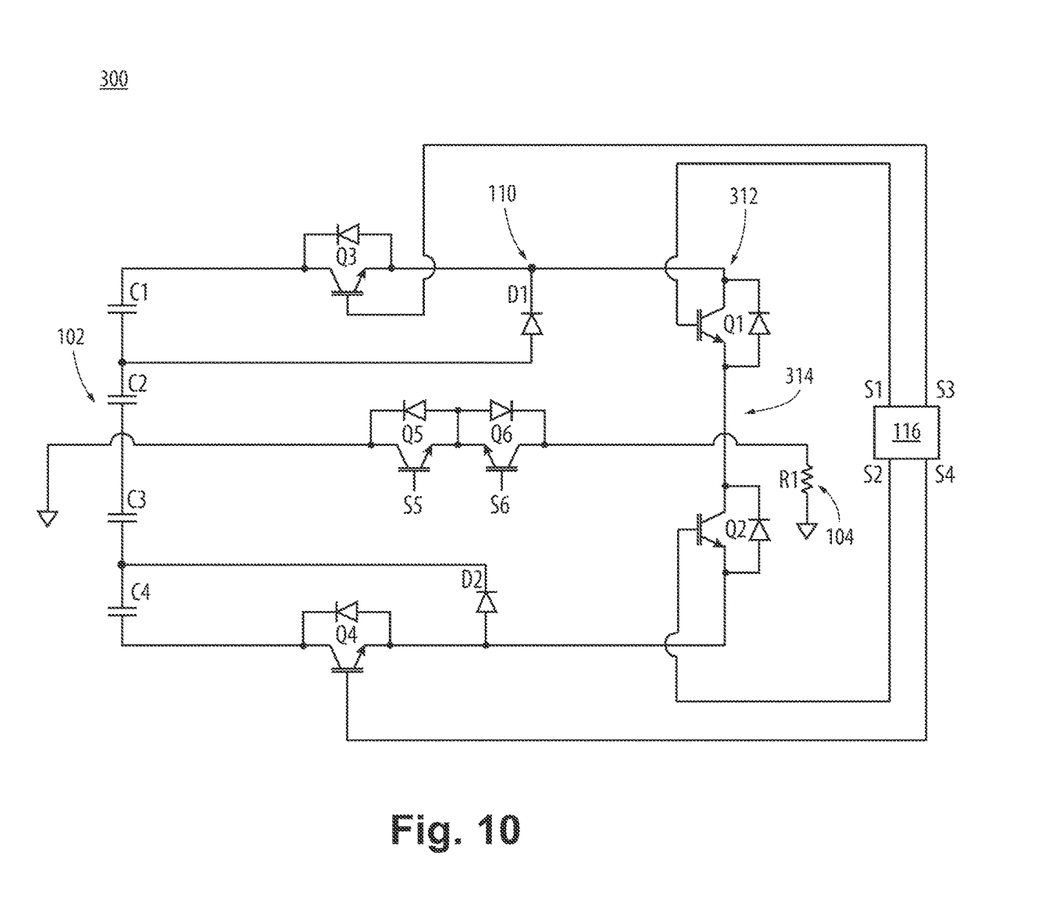
FIG. 10 is a schematic diagram of a system in accordance with this disclosure, showing another embodiment of a power converter having an interconnect switching module and a neutral point clamp.

Turning to FIG. 10, in certain embodiments a system 300 can be similar to that of systems 100 and 200, for example system 300 can have similar components and features with respect to systems 100 and 200. For brevity, the description of common elements that have been described above for systems 100 and 200 are not repeated with respect to system 300 as shown in FIG. 10.

In certain embodiments, such as in system 300, one or more switches Q5, Q6 can be operatively connected directly between the voltage input 102 and the load 104, configured to provide a neutral point clamp for bi-directional switching of the load 104. The switches Q5, Q6 can provide a neutral path from the voltage input 102 to the load 104, without passing through any path provided by switches Q1, Q2, Q3, Q4. While the system 300 is shown in a half bridge configuration in FIG. 10, it will be appreciated by those skilled in the art that the system 300 is also suitable for a full bridge configuration, for example for use with system 200.

The operation of system 300 can be the same or similar as shown and described for systems 100 and 200. For example the switching states for each of Q1, Q2, Q3, Q4 can be common to that of systems 100 and 200 such that the control module 116 can be configured to operate the interconnect switching module 314 to produce multiple output voltage levels, for example for each state of the interconnect switching module 214, while providing the neutral path.

Embodiments of multilevel converters can include relatively low harmonic amplitudes at the converter input and output terminals, reduced switching losses, as well as reduced electromagnetic interference. Embodiments can be suitable for high power and high voltage applications such as HVDC, SVC and AC drives. In certain embodiments, the converter can include Neutral-Point-Clamped Converters (NPCC), for example for use in single- and three-phase bi-directional grid-connected applications, such as in the medium voltage (MV) range. Embodiments can provide improved performance in applications such as, aircraft systems, fans, pumps, marine appliances, mining, traction, uninterrupted power supply (UPS) and renewable energy integration, for example.

Certain typical multilevel converter topologies can be suitable for medium to high voltage and high power applications, but may not provide for high-voltage blocking semiconductors. Embodiments however provide for high-voltage blocking transistors, as well as reduce the total number of active switches/gate drivers, while maintaining a multilevel output. Accordingly, embodiments provide for lower cost power electronics with improved reliability, better power quality, and minimized filtering requirement.

Embodiments of diode bridged switch configuration can be connected modularly for a greater number of flying capacitors. Embodiments an provide high voltage capability with voltage limited devices, low harmonic distortion and less filtering requirements, reduced switching losses due to low switching frequency, increased power conversion efficiency, and improved electromagnetic compatibility.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A system, comprising:
   a DC voltage input configured to receive a DC voltage; and
   a converter electrically coupled to the DC voltage input and configured to be electrically coupled to a load, the converter configured to convert the DC voltage from the DC voltage input to an AC voltage, the converter including:
      a first inverter stage electrically coupled between the DC voltage input and a first diode bridge, wherein the first diode bridge comprises multiple first diodes;
      a second inverter stage configured to be electrically coupled between the first diode bridge and the load, wherein the second inverter stage includes a second diode bridge, and wherein the second diode bridge comprises multiple second diodes; and
      an interconnect switching module electrically coupled to the first and second diode bridges and configured to control an output level of the converter to the load, wherein the interconnect switching module comprises multiple switches;
   wherein the multiple switches of the interconnect switching module are coupled in series with each other between positive and negative lines of the DC voltage input, the first diodes of the first diode bridge are coupled in series with each other between the positive and negative lines of the DC voltage input, and the second diodes of the second diode bridge are coupled in series with each other between the positive and negative lines of the DC voltage input; and
   wherein the first diode bridge is coupled in parallel across the interconnect switching module and the second diode bridge is coupled in parallel across the interconnect switching module.

2. The system of claim 1, wherein:
   the multiple switches include a first switch electrically coupled to the positive line of the DC voltage input and a second switch electrically coupled to the negative line of the DC voltage input;
   the first diodes are coupled in series with each other and with the first and second switches; and
   the second diodes are coupled in series with each other and with the first and second switches.

3. The system of claim 1, wherein the multiple switches of the interconnect switching module include a plurality of transistors configured to be driven by a control module.

4. The system of claim 3, wherein the control module includes computer readable instructions configured to cause the control module to operate the interconnect switching module to control the output level of the converter to the load.

5. The system of claim 4, wherein, in a first state, the computer readable instructions are configured to cause the control module to activate a first switch of the first inverter stage such that a first capacitor provides a positive voltage to the load and a first rectifier diode of the multiple first diodes enters a reverse bias state to stop conducting voltage.

6. The system of claim 5, wherein, in the first state, the computer readable instructions are further configured to cause the control module to activate a second switch of the multiple switches such that the positive voltage from the first capacitor is provided to the load via the second switch.

7. The system as recited in claim 6, wherein, in a second state, the computer readable instructions are configured to cause the control module to deactivate the first switch such that a second capacitor provides the positive voltage to the load through the first rectifier diode and the second switch.

8. The system as recited in claim 7, wherein, in a third state, the computer readable instructions are configured to cause the control module to deactivate the second switch and activate a third switch of the multiple switches such that a third capacitor provides a negative voltage to the load via a second rectifier diode of the multiple first diodes.

9. The system as recited in claim 8, wherein, in a fourth state, the computer readable instructions are configured to cause the control module to activate a fourth switch of the first inverter stage such that the negative voltage from the third capacitor is provided to the load via the fourth switch and the second rectifier diode enters a reverse bias state to stop conducting voltage.

10. The system as recited in claim 4, wherein the computer readable instructions are configured to cause the control module to operate the interconnect switching module to produce multiple output voltage levels.

11. The system of claim 1, wherein the first inverter stage includes one or more switches configured to control a voltage of the DC voltage input.

12. The system of claim 1, wherein the DC voltage input includes a DC link electrically coupled to an input of the first inverter stage, the DC link including two or more capacitors coupled in series between the positive line of the DC voltage input and the negative line of the DC voltage input.

13. The system of claim 12, wherein the two or more capacitors include voltage-dividing capacitors.

14. The system of claim 12, wherein;
   the two or more capacitors includes four capacitors; and
   the diode bridge is a full bridge including four rectifier diodes.

15. The system of claim 12, wherein:
   the two or more capacitors includes four capacitors; and
   the diode bridge is a half bridge including two rectifier diodes.

16. The system of claim 1, wherein the converter includes a multilevel converter.

17. The system as recited in claim 1, further comprising one or more switches electrically coupled directly between the DC voltage input and the load, the one or more switches configured to provide a neutral point clamp for bi-directional switching of the load.

18. The system as recited in claim 1, wherein:
   the first diodes of the first diode bridge form a first circuit branch;
   the second diodes of the second diode bridge form a second circuit branch;
   the multiple switches of the interconnect switching module form a third circuit branch; and
   the first, second, and third circuit branches are coupled to each other only at ends of the circuit branches.

19. The system as recited in claim 1, wherein:
   a node between the first diodes of the first diode bridge is coupled to a DC link of the DC voltage input and not to any of the multiple switches of the interconnect switching module; and
   a node between the second diodes of the second diode bridge is coupled to the DC link of the DC voltage input and not to any of the multiple switches of the interconnect switching module.

20. The system as recited in claim 19, wherein:
- the DC link includes first, second, third, and fourth capacitors coupled in series;
- the node between the first diodes of the first diode bridge is only coupled to a node between the first and second capacitors; and
- the node between the second diodes of the second diode bridge is only coupled to a node between the third and fourth capacitors.

\* \* \* \* \*